US009553416B2

(12) United States Patent
Yamashita

(10) Patent No.: US 9,553,416 B2
(45) Date of Patent: Jan. 24, 2017

(54) WIRE CONNECTION STRUCTURE FOR VEHICLE OPTIONAL PARTS

(71) Applicant: HONDA MOTOR CO., LTD., Tokyo (JP)

(72) Inventor: Naoto Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/845,491

(22) Filed: Sep. 4, 2015

(65) Prior Publication Data

US 2016/0093998 A1 Mar. 31, 2016

(30) Foreign Application Priority Data

Sep. 26, 2014 (JP) ................................ 2014-196814

(51) Int. Cl.
*H04B 3/00* (2006.01)
*H01R 27/02* (2006.01)

(52) U.S. Cl.
CPC .................................... *H01R 27/02* (2013.01)

(58) Field of Classification Search
CPC ..................................................... H01R 27/02
See application file for complete search history.

(56) References Cited

U.S. PATENT DOCUMENTS

2005/0242666 A1* 11/2005 Huscher .............. B60R 16/0232 307/10.1
2007/0257555 A1* 11/2007 Bell .................... B60R 16/0207 307/9.1

FOREIGN PATENT DOCUMENTS

JP 01-100883 4/1989

* cited by examiner

*Primary Examiner* — Daniel Cavallari
(74) *Attorney, Agent, or Firm* — Rankin, Hill & Clark LLP

(57) ABSTRACT

A wire connection structure for vehicle optional part includes a power socket connected to a vehicle power supply, and obtains a power supply for an optional part by cutting in a feeder path supplying electric power to the power socket. In the wire connection structure, a main-side output cord branched from a main harness is preliminarily connected to the back surface side of the power socket by way of couplers. In addition, each optional part harness is provided at an end portion thereof with an option-side output cord and an input cord, which each have a standardized structure. At the time of additionally installing each optional part, the option-side output cord is connected to the power socket, and the main-side output cord or the option-side output cord, which has been detached from the power socket, is bent into a U shape and connected to the input cord.

6 Claims, 13 Drawing Sheets

FIG. 7
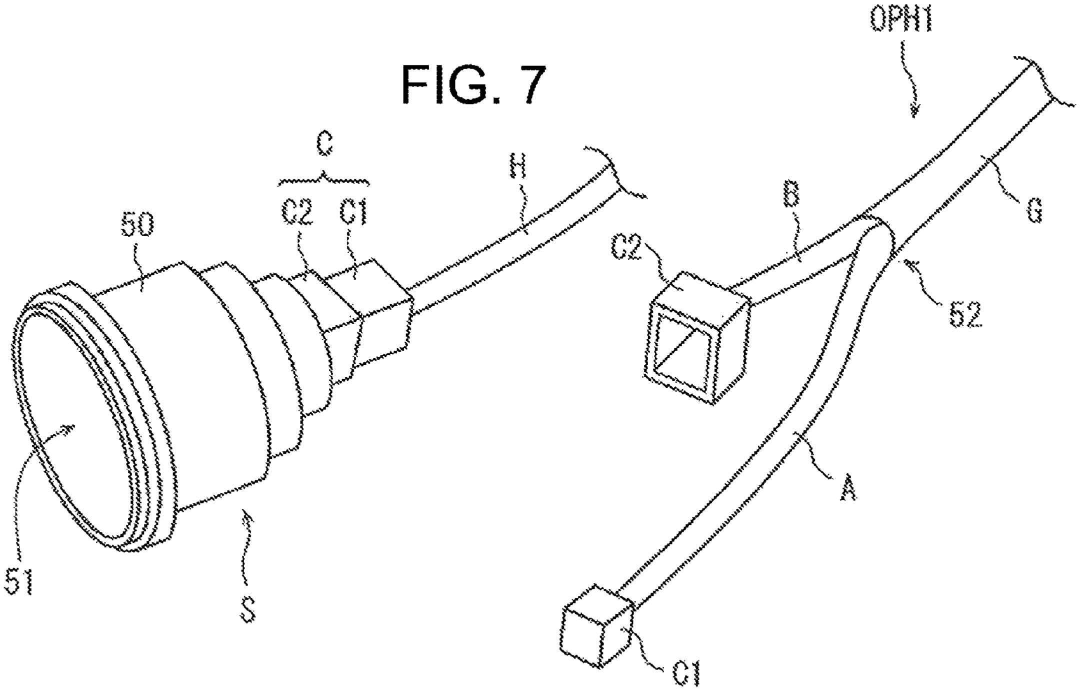
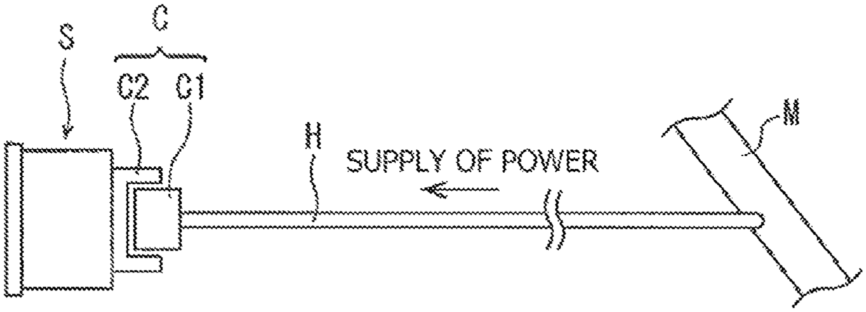
FIG. 8

FIG. 9
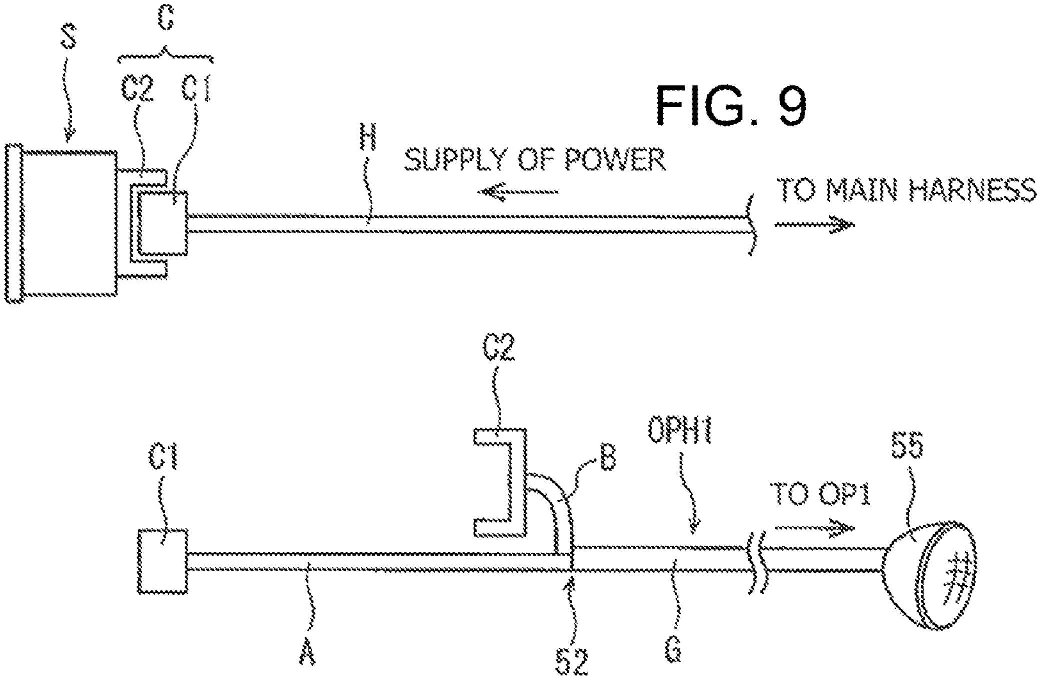
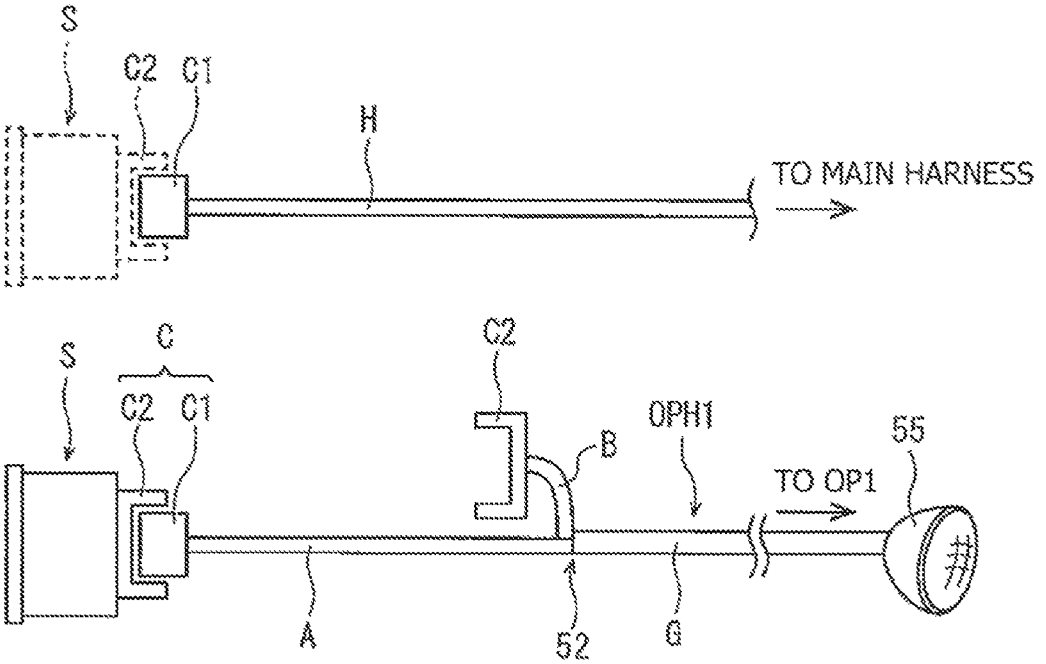
FIG. 10

FIG. 15
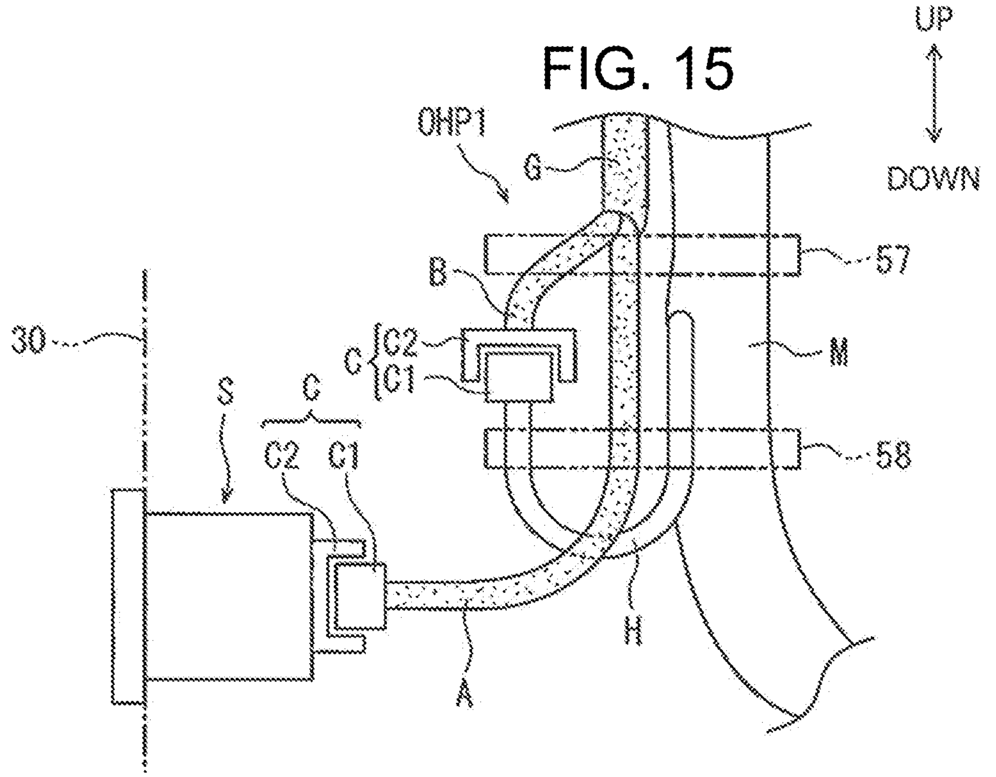
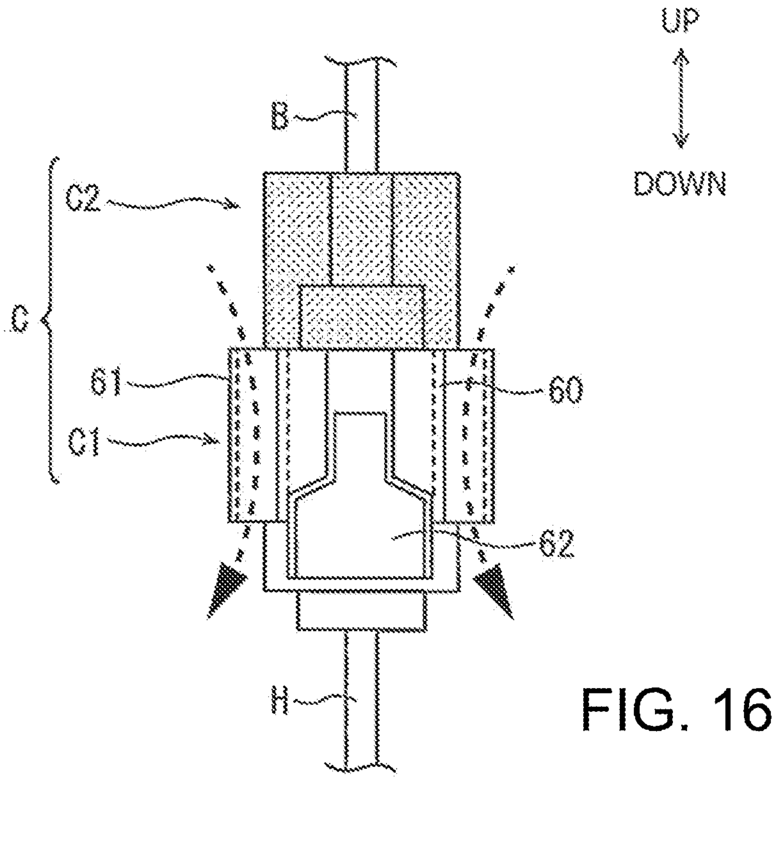
FIG. 16

WIRE CONNECTION STRUCTURE FOR VEHICLE OPTIONAL PARTS

BACKGROUND OF THE INVENTION

Field of the Invention

The present invention relates to a wire connection structure for vehicle optional parts. More particularly, the invention relates to a wire connection structure for vehicle optional parts by which to additionally install a plurality of electronic apparatuses to be driven by a single power supply system.

Description of Related Art

Heretofore, there have been known a variety of structures by which power supply lines of electronic apparatuses to be additionally installed so as to be driven by a single power supply system are allowed to cut in the original power supply system.

Japanese Patent Laid-Open No. Hei 1-100883 discloses an inter-apparatus connection device designed for connecting a plurality of electronic apparatuses in a row by a daisy chain system. In this inter-apparatus connection device, standardization of connection cables is realized by connecting the connection cables between the apparatuses by way of common cable relays.

In addition, Japanese Utility Model Laid-Open No. Sho 62-70038 discloses a wire connection structure for additionally installing electronic apparatuses as optional parts in a meter device of a vehicle. In this structure, a feeder socket to be connected to a back side of an optional part is designed to be compatible with an existing socket hole formed in a meter case.

Meanwhile, optimization of a wire connection structure has been investigated. This is for the purpose of ensuring that in the case of additionally installing an auxiliary light, a winch or the like as a vehicle optional part in a vehicle, also, a wiring of the optional part is allowed to cut in the original wiring structure supplied with power from an on-vehicle battery.

However, in the technologies described in Japanese Patent Laid-Open No. Hei 1-100883 and Japanese Utility Model Laid-Open No. Sho 62-70038, investigation has not been made of enhancement of workability in connecting a feeder cord of a vehicle optional part, or of a contrivance for efficiently arranging the feeder cords the number of which increases as each vehicle optional part is additionally installed.

SUMMARY OF THE INVENTION

It is an object of the present invention to provide a wire connection structure for vehicle optional parts by which the above-mentioned problems in the related art can be solved, the workability in connecting feeder cords can be enhanced, and a wiring space can be reduced.

According to one aspect of the present invention, there is provided a wire connection structure for vehicle optional parts. The wire connection structure includes a power socket connected to a power supply of a vehicle, and obtains a power supply for an optional part by cutting in a feeder path supplying electric power to the power socket. The wire connection structure for vehicle optional parts wherein a main-side output cord for supplying electric power to the power socket is branched from a main harness in which a plurality of wires are bundled; the power socket and the main-side output cord are disconnectably connected to each other through a pair of couplers; an optional part harness for supplying electric power to the optional part attached to one end side thereof is provided at another end portion thereof with an option-side output cord and an input cord which are bifurcated from a gathering part; the option-side output cord and the power socket are disconnectably connected to each other through a pair of couplers, and the input cord and the main-side output cord are disconnectably connected to each other through a pair of couplers; the option-side output cord is formed to be longer than the input cord; and at the time of additionally installing the optional part in the vehicle, the option-side output cord of the optional part harness for the optional part to be additionally installed is connected to the power socket, and the main-side output cord or the option-side output cord which has been connected to the power socket is bent into a U shape and then connected to the input cord.

Accordingly, the following features are ensured. The main-side output cord for supplying electric power to the power socket is branched from a main harness in which a plurality of wires are bundled. The power socket and the main-side output cord are disconnectably connected to each other through a pair of couplers. The optional part harness for supplying electric power to the optional part attached to one end side thereof is provided at another end portion thereof with the option-side output cord and the input cord which are bifurcated from the gathering part. The option-side output cord and the power socket are disconnectably connected to each other through a pair of couplers, and the input cord and the main-side output cord are disconnectably connected to each other through a pair of couplers. The option-side output cord is formed to be longer than the input cord. Further, at the time of additionally installing the optional part in the vehicle, the option-side output cord of the optional part harness for the optional part to be additionally installed is connected to the power socket, and the main-side output cord or the option-side output cord which has been connected to the power socket is bent into a U shape and then connected to the input cord. Therefore, it is possible to allow the optional part harness to cut in a line between the power socket and the main-side output cord and thereby to secure a power supply for the optional part, while retaining the function of the power socket. In this case, the main-side output cord or the option-side output cord which is bent into a U shape and the input cord can be easily bundled collectively. Consequently, the work of additionally installing the optional part harness can be facilitated, and the wiring space can be reduced.

Besides, when the main-side output cord or the option-side output cord which is bent in a U shape and the input cord are bundled collectively onto the main harness, the wiring space can be further reduced.

According to another aspect of the present invention, the option-side output cord and the input cord each individually have the same structure for different optional parts. Therefore, where two or more optional parts are additionally installed, also, the couplers are aligned at equivalent positions in the wiring direction, so that the plurality of optional part harnesses can be bundled collectively in the equivalent positions. Accordingly, the same workability as in additionally installing the first optional part can be maintained also at the times of additionally installing the second and latter optional parts.

According to another aspect of the present invention, the main harness is laid in an up-down direction of the vehicle; the option-side output cord is provided at an end portion thereof with a male coupler of the pair of couplers; and the power socket and an end portion of the input cord are each provided with a female coupler of the pair of couplers. Therefore, when the optional part harness of the optional part installed additionally is bundled collectively with the main harness, the female coupler is located on the upper side and the male coupler is located on the lower side. Consequently, the female coupler of the pair of couplers which has a recess is oriented downward, so that the possibility of penetration of water, dust or the like into a terminal portion of the couplers can be reduced.

According to another aspect of the present invention, the main harness is laid in an up-down direction of the vehicle; the option-side output cord is provided with a male coupler of the pair of couplers; and the power socket and the input cord are each provided with a female coupler of the pair of couplers. Therefore, where two or more optional parts are to be additionally installed, also, the female coupler is located on the upper side whereas the male coupler is located on the lower side in every pair of couplers. Accordingly, the possibility of penetration of water, dust or the like into the terminal portions of the couplers can be lowered.

According to another aspect of the present invention, the optional part harness is laid along a support frame extending in a vehicle width direction of the vehicle over the power socket. With the optional part harness fixed to the vehicle body frame, therefore, the optional part harness directed in the up-down direction in the additionally installed part can be stably laid while being directed toward a vehicle lateral side. In addition, a fixing part for the optional part harness can be easily secured, and the number of operating steps in additionally installing an optional part can be reduced.

According to another aspect of the present invention, a large-diameter wiring for supplying electric power to a motor for a power steering mechanism is laid along the support frame). Therefore, the optional part harness can be stably fixed onto the vehicle body frame together with the large-diameter wiring.

BRIEF DESCRIPTION OF THE DRAWINGS

These and further features of the invention will be apparent with reference to the following description and drawings, wherein:

FIG. 7 is a view for explaining the structure of a power socket and an optional part harness;

FIG. 8 is a diagram showing a wiring state in the case where there is no optional part arranged;

FIG. 9 is a diagram showing a wiring state in the case where an auxiliary light as an optional part is arranged in proximity;

FIG. 10 is a diagram showing a wiring state in the case where a first connection changing procedure has been carried out;

FIG. 15 is a diagram showing a wiring structure in the state of being mounted to the off-road four-wheel-drive vehicle (there is an optional part or parts);

FIG. 16 is a plan view of a coupler;

DETAILED DESCRIPTION OF THE INVENTION

Figure 1:
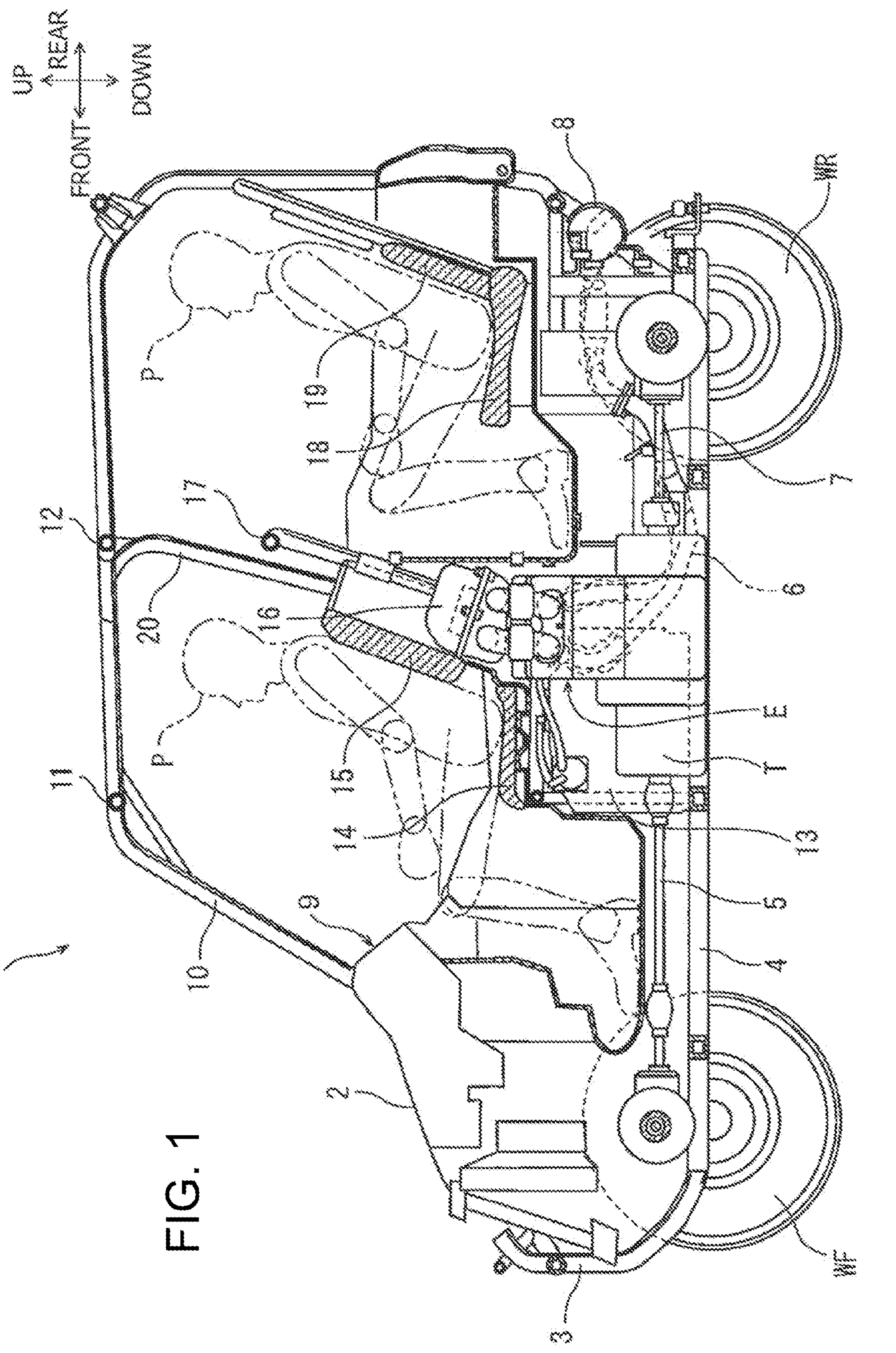
FIG. 1 is a left side view of an off-road four-wheel-drive vehicle to which a wire connection structure for a vehicle optional part according to an embodiment of the present invention has been applied.
Figure 2:
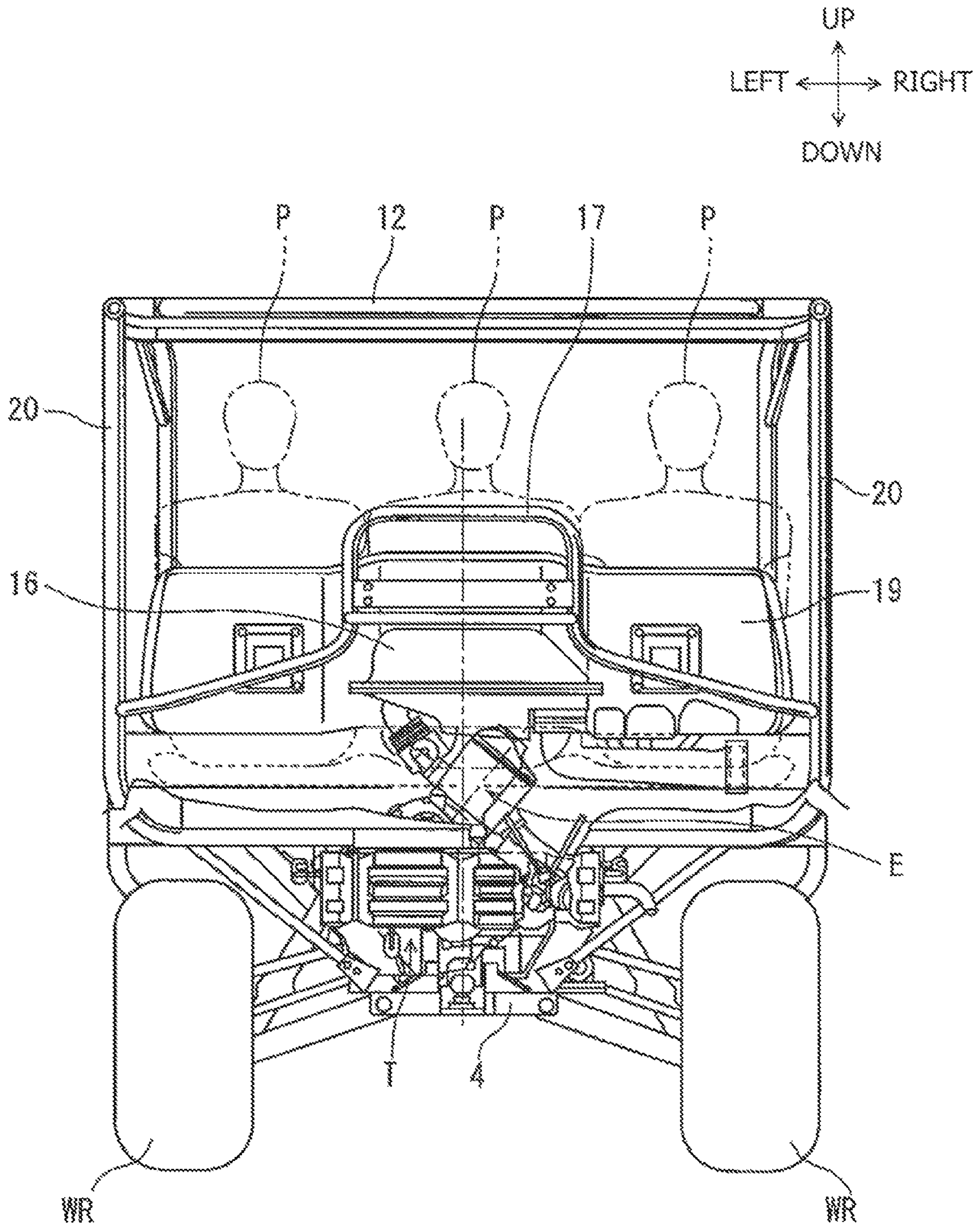
FIG. 2 is a front sectional view of the off-road four-wheel-drive vehicle.

A preferred embodiment of the present invention will now be described in detail below, referring to the attached drawings. FIG. 1 is a left side view of an off-road four-wheel-drive vehicle 1 to which a wire connection structure for vehicle optional parts according to an embodiment of the present invention has been applied. FIG. 2 is a front sectional view of the off-road four-wheel-drive vehicle 1. The off-road four-wheel-drive vehicle 1 as an all-terrain vehicle having no closed vehicle compartment is a four-wheel-drive vehicle wherein a driving force of an engine E disposed in the center of a vehicle body is transmitted through propeller shafts 5 and 7 mounted to the front and the rear of a transmission T, to rotate two front wheels WF and rear wheels WR.

An air cleaner box 16 is disposed over the engine E, and a combustion gas in the engine E is let flow through an exhaust pipe 6, to be discharged via a muffler 8 disposed at the rear of the vehicle body. A backrest 15 for passengers P is disposed forwardly of the air cleaner box 16, and a seating section 14 for the passengers P is arranged over a fuel tank 13 disposed on a lateral side of the engine E.

A main frame 4 extends in the longitudinal vehicle direction, and supports thereon the engine E, the front and rear wheels WF and WR and the like. A bumper 3 is mounted to a front end portion of the main frame 4, and left and right roll bars 10 surrounding the periphery of the passengers P are supported by the main frame 4. A rear upper side of the bumper 3 is covered with a front cover 2 provided with a headlight, and an instrument panel 9 is formed in such a position as to face the passengers P.

The left and right roll bars 10 are connected by connection pipes 11 and 12 oriented in the vehicle width direction, and are supported from below by left and right side bars 20 oriented in the vertical direction. In addition, a handrail 17 to be gripped by the passengers P seated in rear seats 18, 19 is secured to the side bars 20.

Figure 3:
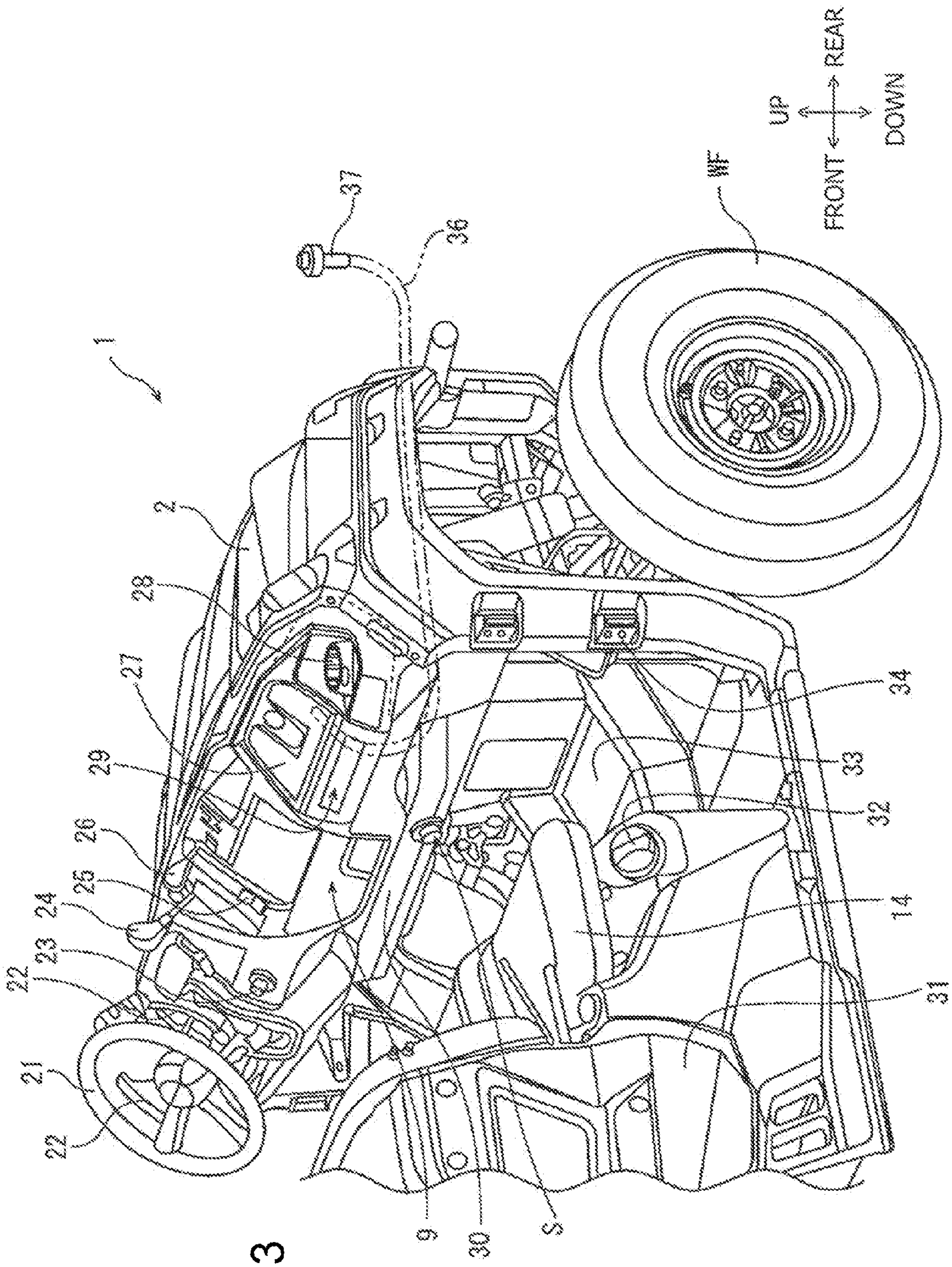
FIG. 3 is a partial enlarged perspective view of the off-road four-wheel-drive vehicle.

FIG. 3 is a partial enlarged perspective view of the off-road four-wheel-drive vehicle 1. In this view, the vehicle's state in which the roll bars 10 have been removed is shown. Rear doors 31 are provided at the left and right on the rear of the seating section 14 for the passengers P, and footrest floors 33 are formed on a front lower side of the seating section 14. A cap 32 of the fuel tank 13 is provided at a lateral lower side of the seating section 14. Hinges 34 for attaching front doors (not shown) are provided at lateral sides of the footrest floors 33.

At the instrument panel 9 covered with a plate member 30, there are arranged a steering wheel 21 equipped with left and right shift paddles 22, a starting switch 23, a shift lever 24, and a drive mode switching lever 26, in this order from the left side along the vehicle width direction. The shift lever 24 has a function of switching among a parking position (P), a reverse position (R), a drive position (D) and the like, and the shift paddles 22 enable a semi-automatic shift for intervening in automatic shift when the D position is selected. Besides, the drive mode switching lever 26 enables switching between four-wheel drive and rear-wheel two-wheel drive.

A cup holder 28 on the passenger's seat side and a lid member 27 of a glove box 29 are provided at the right side in the vehicle width direction of the instrument panel 9. A switch wiring 36 connected with an operation switch 37 of a winch device as an optional part can be accommodated in the glove box 29. In addition, between the shift lever 24 and the drive mode switching lever 26, there is provided an on-off switch 25 for the auxiliary light as an optional part.

In the off-road four-wheel-drive vehicle 1 according to this embodiment, a power socket S through which power supply can be obtained from an on-vehicle battery (12 V, for example) is disposed at a rather lower position in the center in the vehicle width direction of the instrument panel 9. When a dedicated plug corresponding to the power socket S is inserted into the power socket S, it is possible, for example, to obtain a power supply for a miniature light or a cleaner, or to charge a cell phone or a shaver.

When the power socket S is used, a power supply for the auxiliary light or the winch device each serving as an optional part can also be obtained. However, these optional parts are not an optional part that is frequently attached and detached after once attached to the vehicle body. Besides, once the power socket S is occupied by an optional part, replacement of the plug fitted into the power socket S is needed at the time of using other electronic apparatus. In addition, there arises a problem that it is difficult to additionally install a plurality of optional parts.

In view of this, in this embodiment, a power supply for an optional part or parts is obtained from a back surface part of the power socket S projecting to the back side of the plate member 30 of the instrument panel 9. This ensures that an optional part can be additionally installed while securing the power socket S, and a connection portion of a harness for the optional part is prevented from being exposed to the face side of the instrument panel 9. A specific wire connection structure in this embodiment will be described later.

Figure 4:
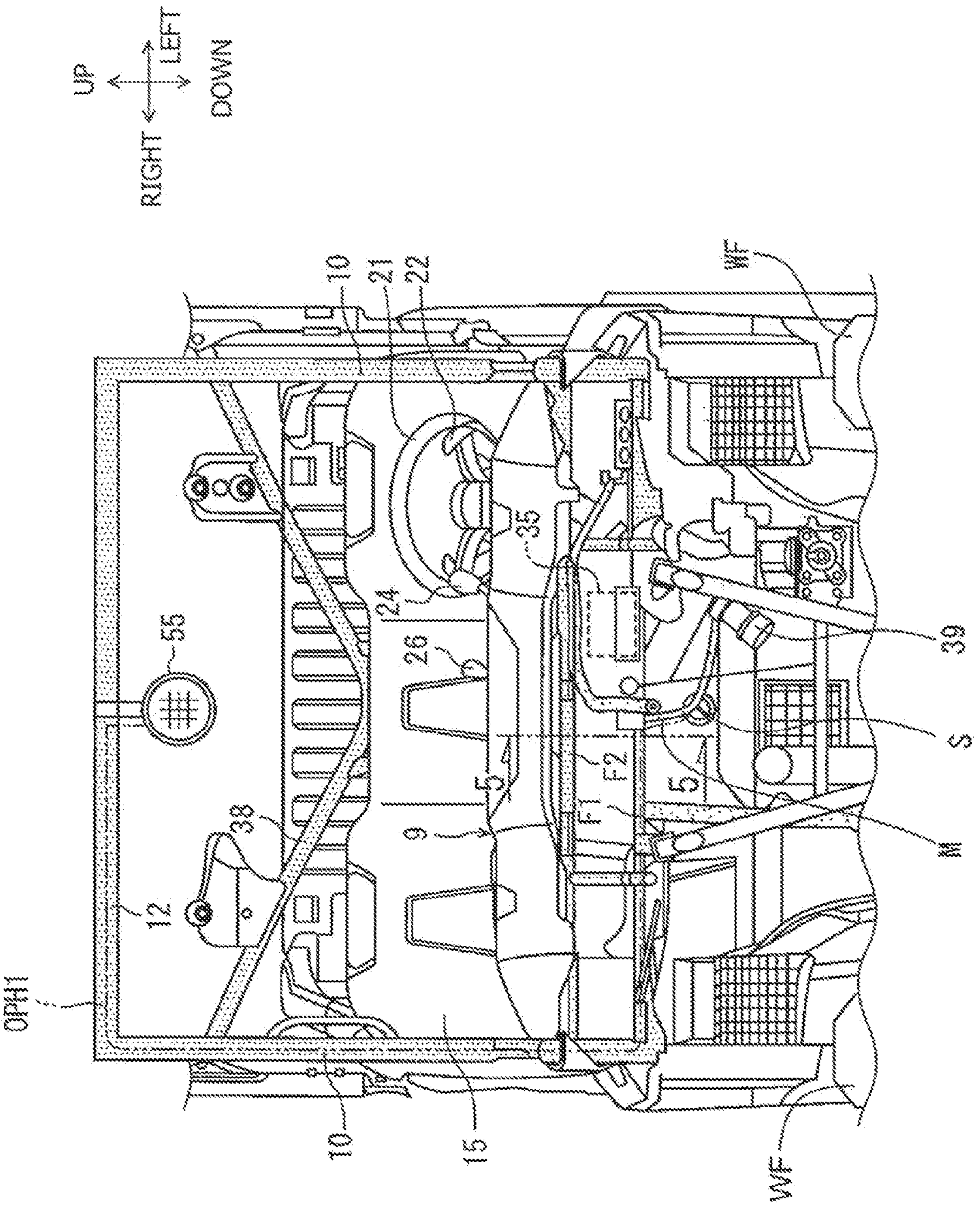
FIG. 4 is a front sectional view of the off-road four-wheel-drive vehicle, at section on the forward side of an instrument panel.
Figure 5:
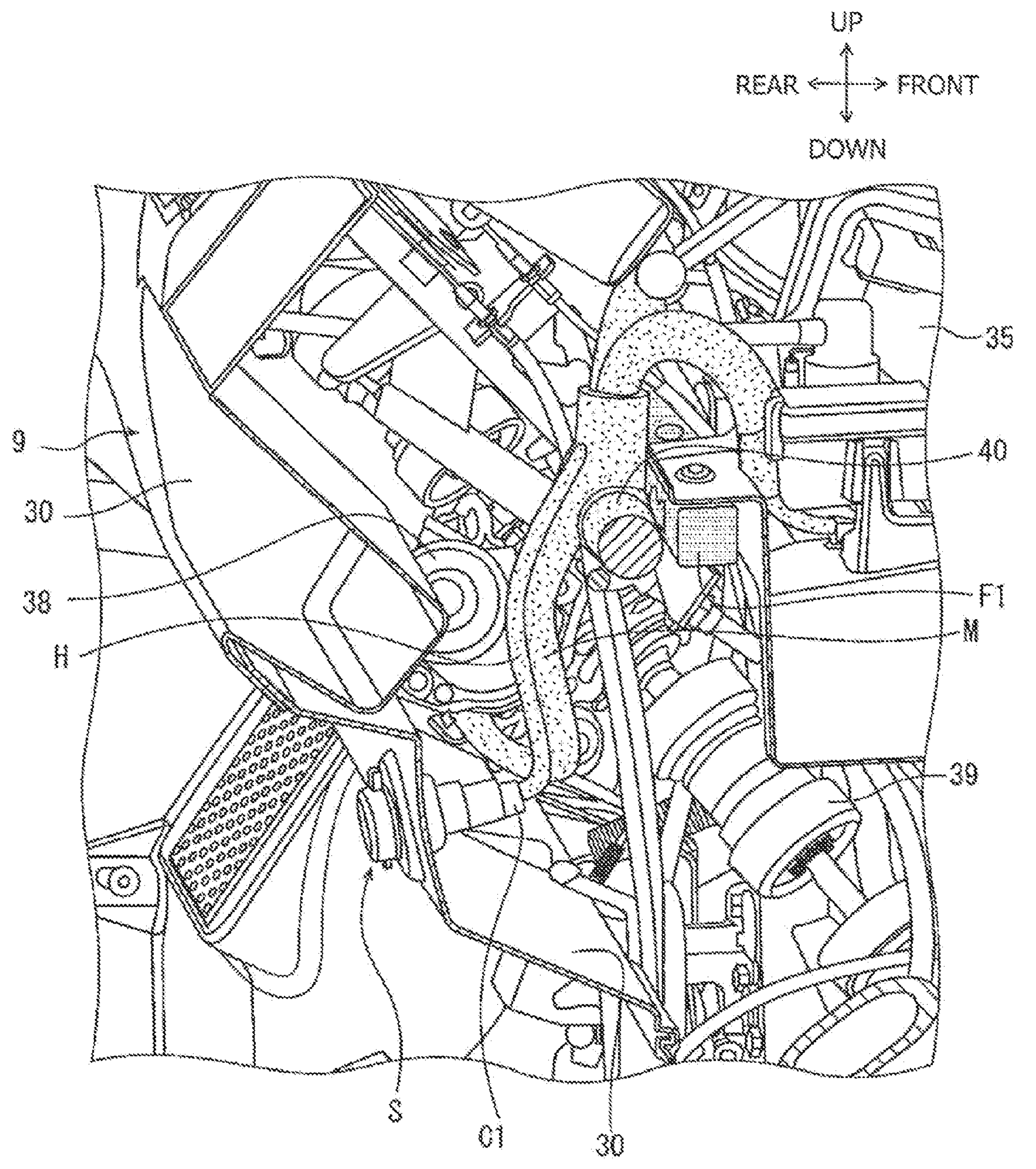
FIG. 5 is a sectional view taken along line 5-5 of FIG. 4.

FIG. 4 is a front sectional view of the off-road four-wheel-drive vehicle 1, at a section on the forward side of the instrument panel 9. FIG. 5 is a sectional view taken along line 5-5 of FIG. 4. On the forward side of the plate member 30 constituting the instrument panel 9, there are disposed support frames F1 and F2 which are directed in parallel to each other in the vehicle width direction and connected to base portions of the roll bars 10. The support frames F1, F2 support the instrument panel 9 on the vehicle body rear side, and support a power steering device 39, an on-vehicle battery 35 and the like on the vehicle body front side.

The power socket S is located on a vehicle body rear lower side of the lower-side support frame F1. Besides, a large-diameter wiring 40 is laid in parallel to the lower-side frame F1. The large-diameter wiring 40 for supplying electric power to a motor 38 provided as a motive power source for the power steering device 39 is supported in relation to the lower-side support frame F1 by a support member 46 such as a resin band.

On the other hand, under the large-diameter wiring 40, a main harness M in which a plurality of wires are bundled is laid in the state of being directed in the up-down direction of the vehicle body. A main-side output cord H for supplying electric power to the power socket S is branched from the main harness M, and is connected to the back surface portion of the power socket S by a male coupler C1.

FIG. 4 shows an auxiliary light (first optional part) 55 as the aforementioned optional part. The auxiliary light 55 is attached to the connection pipe 12 of the roll bar 10, and an optional part harness OPH1 for supplying electric power thereto is laid along the connection pipe 12, the roll bar 10 and the support frame F1 and led to a rear end portion of the power socket S. By being laid along these frame members, the optional part harness OPH1 is stably supported on the vehicle body.

Figure 6:
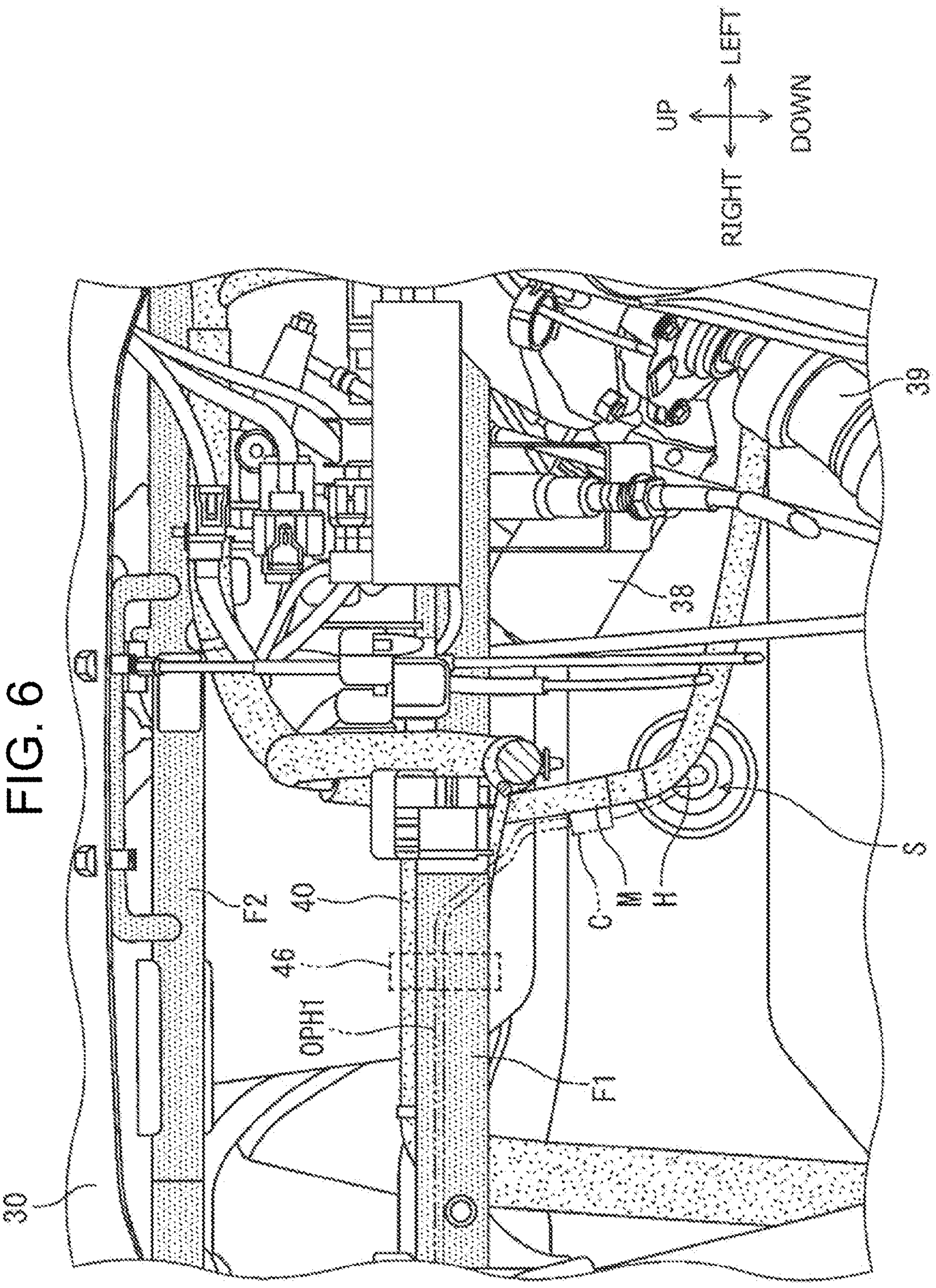
FIG. 6 is a partial enlarged view of the instrument panel, as viewed from the back surface side thereof.

FIG. 6 is a partial enlarged view of the instrument panel 9, as viewed from the back surface side (the vehicle body front side) thereof. As aforementioned, the optional part harness OPH1 is supported on the support frame F1 together with the large-diameter wiring 40 for supplying electric power to the power steering motor 38. An end portion of the optional part harness OPH1 is so connected that a power supply can be obtained through a pair of couplers C at a position between the support frame F1 and the power socket S. Upper and lower portions of the couplers C can be fixed by bundling them onto the main harness M directed in the up-down direction of the vehicle body.

FIG. 7 is a view for explaining the structures of the power socket S and the optional part harness OPH1. A cylindrical main body section 50 of the power socket S is formed with a plug hole 51 into which to insert a dedicated plug, and a female coupler C2 is fixed to a rear end portion of the main body section 50. In the case where there is no optional part to be arranged, the male coupler C1 of the main-side output cord H branched from the main harness M is connected to the female coupler C2, whereby a connected state based on the pair of couplers C is configured.

On the other hand, the optional part harness OPH1 has a structure wherein an option-side output cord A and an input cord B are branched from a gathering part 52 at an end portion of a gathered wiring G. The length of the option-side output cord A is set to be about twice the length of the input cord B. For instance, when the input cord B is 6 cm in length, the option-side output cord A can be 13 cm in length. A male coupler C1 is provided at an end portion of the option-side output cord A, and a female coupler C2 is provided at an end portion of the input cord B.

Referring to FIGS. 8 to 13, a mode of connection of wires attendant on additional installation of an optional part or parts will now be described below. FIG. 8 is a diagram showing a wiring state in the case where no optional part is arranged. In the case where no optional part is arranged, the main-side output cord H branched from the main harness M is connected to the power socket S by the pair of couplers C.

FIG. 9 is a diagram showing a wiring state in the case where the auxiliary light 55 as a first optional part OP1 is arranged. An option-side output cord A and an input cord B are provided in a branched state at one end portion of the optional part harness OPH1, and the auxiliary light 55 is connected to another end portion of the optional part harness OPH1.

FIG. 10 is a diagram showing a wiring state in the case where a first connection changing procedure has been carried out. In the case of cutting-in connection of the optional part harness OPH1, first, the first connection changing procedure is carried out wherein the main-side output cord H is disconnected from the power socket S and the option-side output cord A is connected to the power socket S in a replacing manner (or in a connection changing manner).

Figure 11:
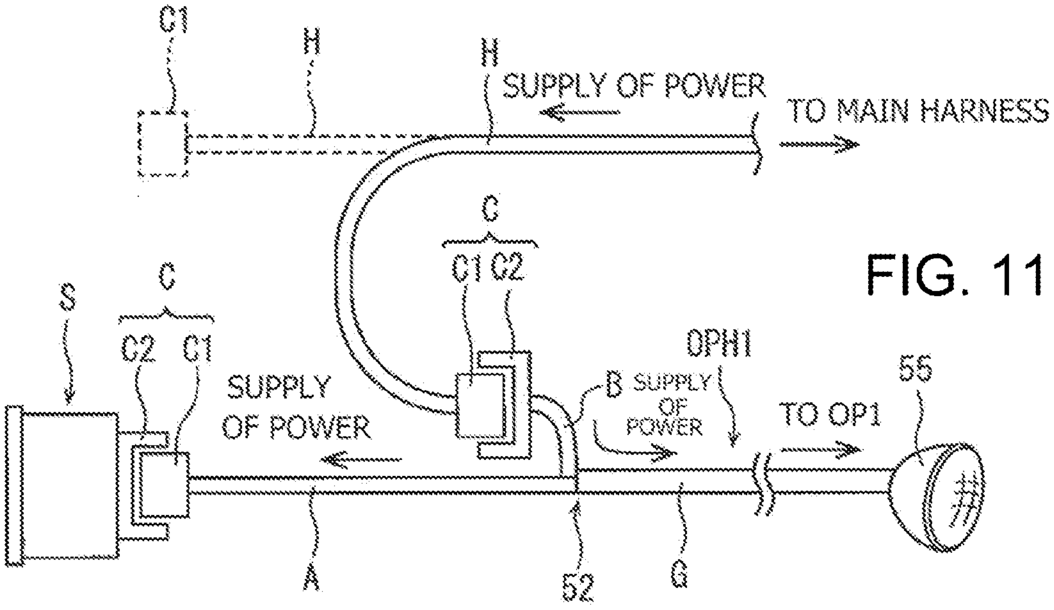
FIG. 11 is a diagram showing a wiring state in the case where a second connection changing procedure has been carried out.

FIG. 11 is a diagram showing a wiring state in the case where a second connection changing procedure has been carried out. When the aforementioned first connection changing procedure is conducted, the main-side output cord H is brought into an unoccupied state. In view of this, the second connection changing procedure is carried out wherein the main-side output cord H is bent to change the direction of the male coupler C1 and is fitted into the female coupler C2 of the input cord B in a connection-changing manner. By the above-mentioned procedure, two sets of coupler connections are established, and the optional part harness OPH1 is allowed to cut in the line on the rear end side of the power socket S, whereby a power supply for the auxiliary light 55 can be obtained while retaining the function of the power socket S. Incidentally, the optional part harness OPH1 is provided with a switch wiring (see FIG. 18) to be connected to the on-off switch 25 (see FIG. 3).

Figure 12:
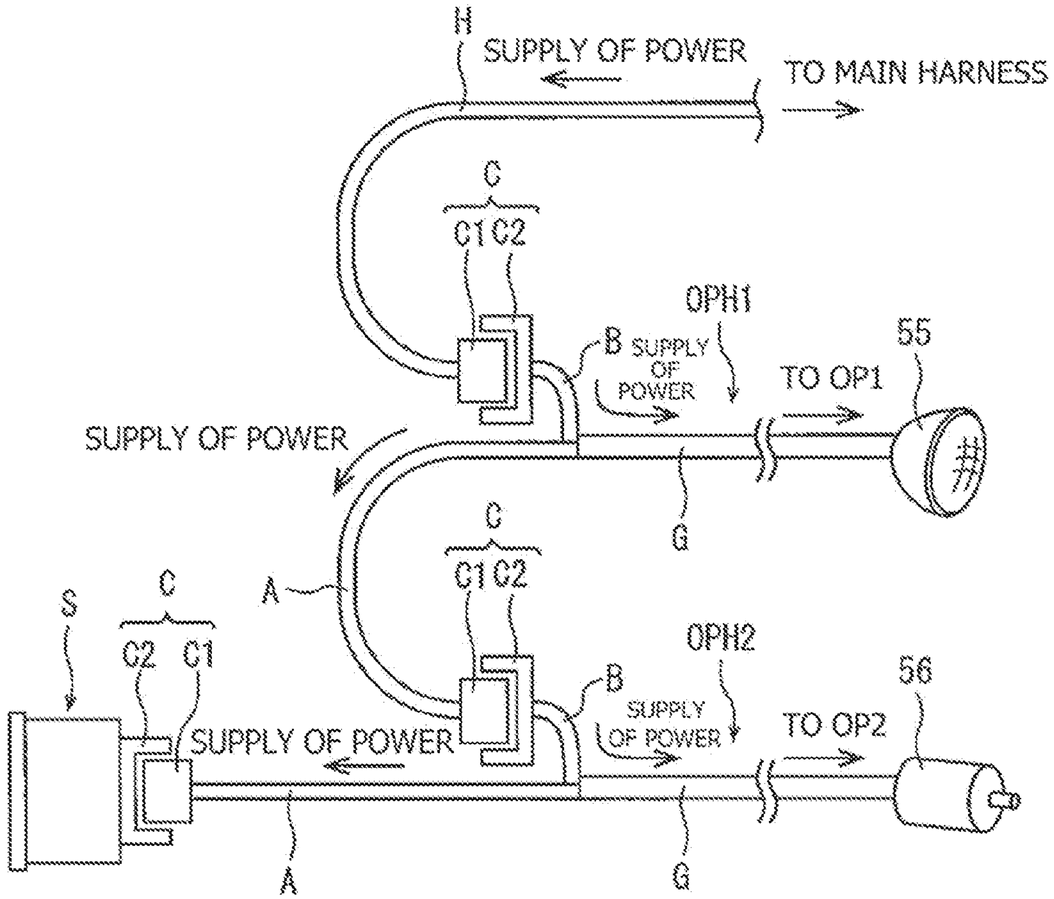
FIG. 12 is a diagram showing a wiring structure in the case where a first optional part and a second optional part are installed additionally.

FIG. 12 is a diagram showing a wiring structure in the case where in addition to the auxiliary light 55 as the first optional part OP1, a winch device 56 as a second optional part OP2 is installed additionally. In the case where an optional part harness OPH2 for the winch device 56 is arranged in a cutting-in manner, the aforementioned first connection changing procedure and second connection changing procedure can be carried out in the same manner as above. This is because the option-side output cord A and the input cord B are standardized, or can individually be commonly used, for different optional parts. Incidentally, the optional part harness OPH2 for the winch device 56 is connected with the switch wiring 36 (see FIG. 3) to be connected to the operation switch 37.

The aforementioned wire connecting procedure is adopted in the same manner also in the case where other optional part such as a horn is additionally installed. In addition, since the option-side output cord A and the input cord B are standardized, or can be commonly used, irrespectively of the kinds of the optional parts, there is no limitation as to the order in which the optional parts are additionally installed.

Figure 13:
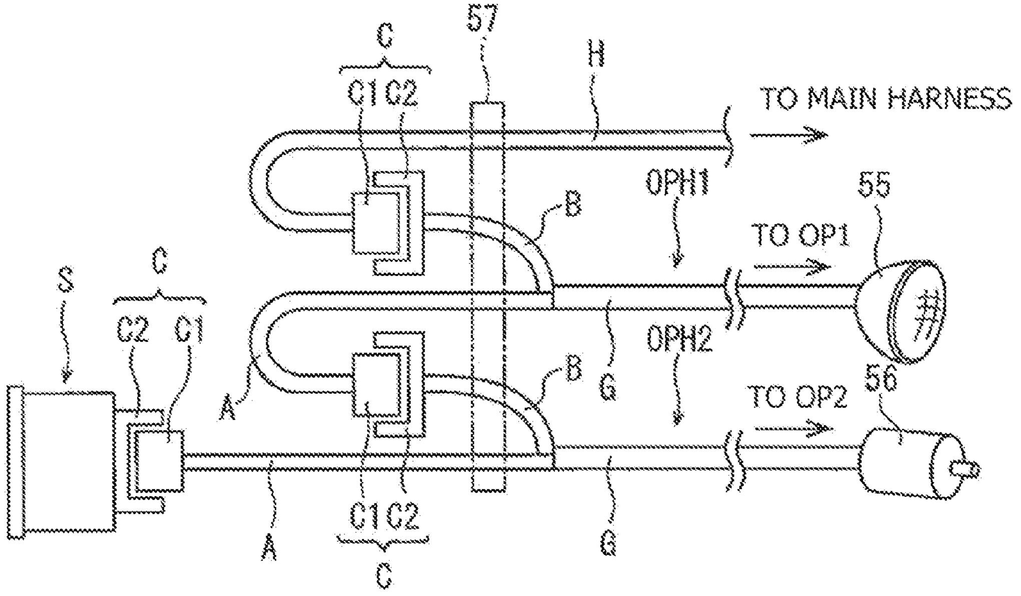
FIG. 13 is a diagram showing a wiring structure in the case where the degrees of bending of a main-side output cord and an option-side output cord are increased, in the condition where the first and second optional parts are connected.

FIG. 13 is a diagram showing a wiring structure in the case where the degrees of bending of the main-side output cord H and the option-side output cord A are increased in the condition where the first optional part OP1 and the second optional part OP2 are connected. The main-side output cord H and the option-side output cord A are flexible members in which copper wires are covered with vinyl resin tube or the like; therefore, these cords can be bent into a U shape, and can be substantially folded in two by increasing the degree of bending. This enables the main-side output cord H, the option-side output cord A and the input cords B to be easily bundled collectively by use of a band 57 or the like. In this case, the couplers C are aligned at equivalent positions in the wiring direction, which ensures that the bundling operation can be performed more easily.

Figure 14:
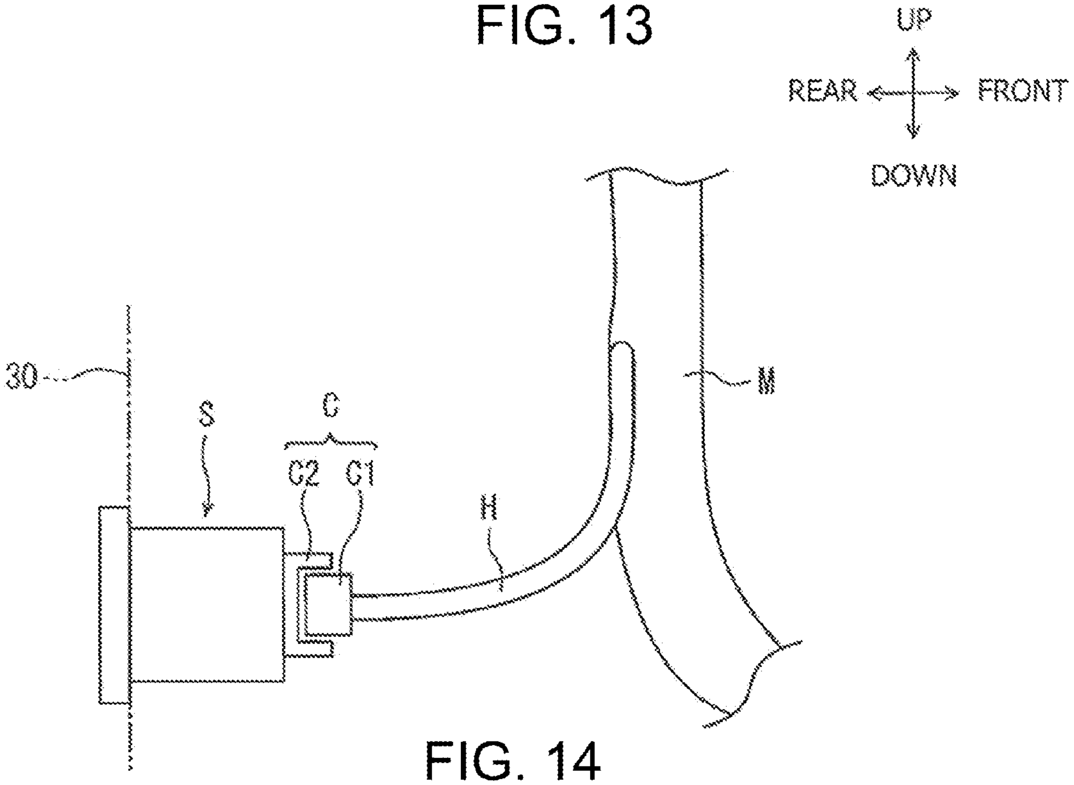
FIG. 14 is a diagram showing a wiring structure in the state of being mounted to the off-road four-wheel-drive vehicle (there is no optional part)

FIGS. 14 and 15 are diagrams showing a wiring structure in the state of being mounted to the off-road four-wheel-drive vehicle 1. FIG. 14 shows a state wherein as has been described using FIG. 5, there is no optional part arranged and the main-side output cord H branched from the main harness M is connected to the power socket S at a position on a rear lower side of the branching section. The shapes and lengths of the wires shown in FIG. 14 correspond to those described in FIG. 5.

FIG. 15 is a diagram showing the wiring structure in a state wherein the optional part harness OPH1 is connected. The optional part harness OPH1 is laid upward along the main harness M directed in the up-down direction of the vehicle body, so that the female coupler C2 of the input cord B necessarily has its opening portion directed downward. To the female coupler C2, the male coupler C1 of the main-side output cord H is connected from below. This ensures that even when water, dust or the like is deposited from above the couplers C, the possibility of the water, dust or the like influencing the connection terminal part is reduced.

The option-side output cord A and the input cord B can be supported onto the main harness M by the band 57 collectively at a position above the couplers C. In addition, the main-side output cord H folded in two to be directed upward and the option-side output cord A can be supported onto the main harness M by a band 58 collectively at a position below the couplers C. Note that in the case of further additionally installing the second optional part harness OPH2, not only the main-side output cord H is folded in two but also the option-side output cord A of the first optional part harness OPH1 is also folded in two, and these cords are collectively supported.

Besides, according to the aforementioned configuration, even where two or more optional parts are additionally installed, the positions of the couplers C in the vertical direction are substantially the same, which is suitable for collectively supporting the wires.

FIG. 16 is a plan view of the couplers C. As aforementioned, the couplers C of the same type are used for the main-side output cord H, the power socket S and the optional part harness OPH1. In the case of connecting wires directed in the vertical direction, the female coupler C2 is disposed on the upper side, and the male coupler C1 is disposed on the lower side, whereby penetration of water or the like into the connection terminal part can be prevented.

In this embodiment, on the outside of a plug portion 60 of the male coupler C1, there is provided a tubular cover 61 which has a locking mechanism 62 for locking with the female coupler C2. Therefore, even though the male coupler C1 on the lower side appears larger, water or the like adhering to the couplers C passes down through a gap between the plug portion 60 and the cover 61.

Figure 17:
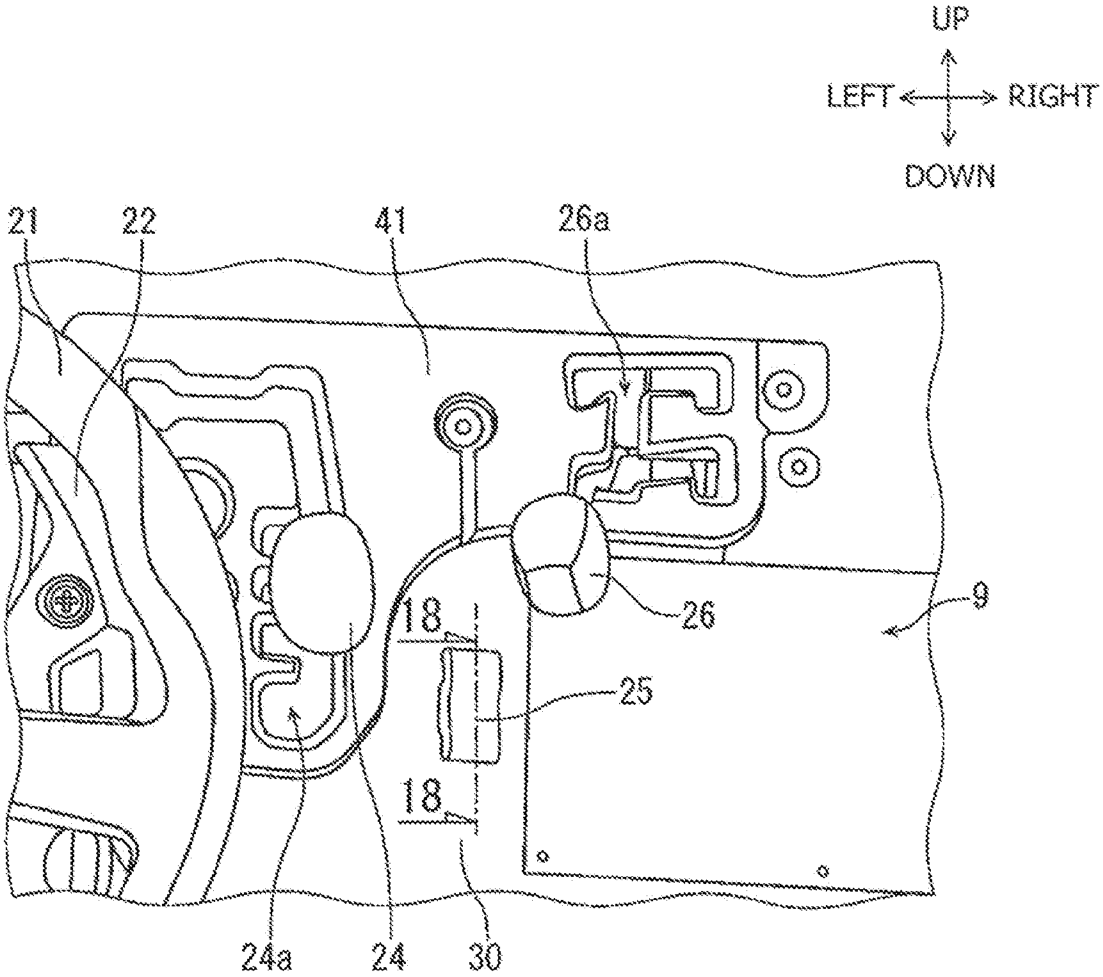
FIG. 17 is a partial enlarged view of the instrument panel in the periphery of a shift lever.
Figure 18:
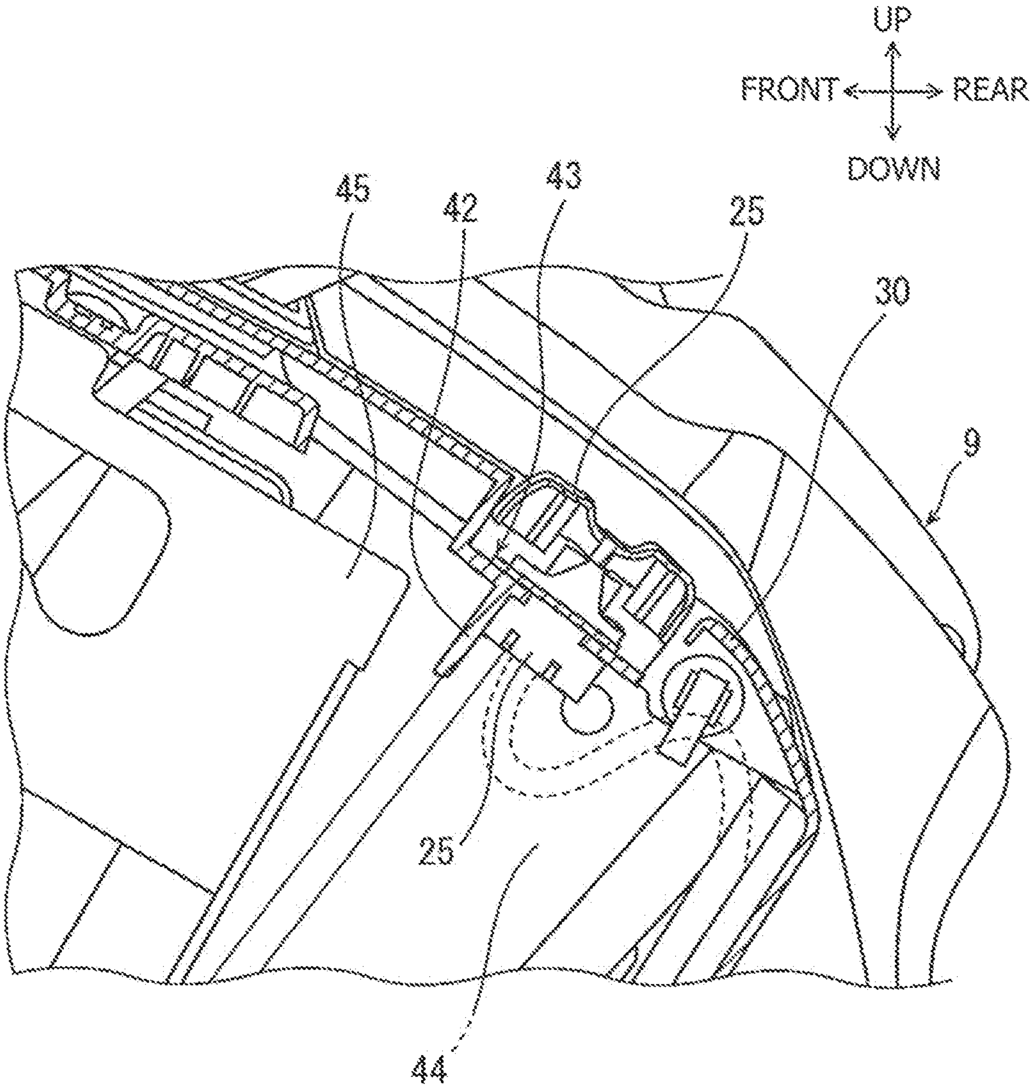
FIG. 18 is a sectional view taken along line 18-18 of FIG. 17.

FIG. 17 is a partial enlarged view of the instrument panel 9 in the periphery of the shift lever 24. FIG. 18 is a sectional view taken along line 18-18 of FIG. 17. The shift lever 24 and the drive mode switching lever 26 are configured to move respectively along shift gates 24*a* and 26*a* which are formed in a metallic plate 41.

The on-off switch 25 for the auxiliary light 55 is attached to a recessed portion 43 formed in the plate member 30, at a position between the shift lever 24 and the drive mode switching lever 26. When the on-off switch 25 is attached to the recessed portion 43, a switch wiring 44 extending from a wire connection part 24 is laid toward the lower side of the recessed portion 43. In this embodiment, a plate-shaped eaves member 42 is formed which makes contact with the upper side of the wire connection part 24 and extends in the leading-out direction of the switch wiring 44. In order to attach the on-off switch 25 to the plate member 30 of the instrument panel 9, the attaching work must be carried out in the condition where the plate member 30 is detached from the vehicle body, since the attaching work involves an operation to be carried out from the back surface side of the plate member 30. In this case, when it is attempted to mount the plate member 30 onto the vehicle body together with the on-off switch 25 attached thereto, the wire connection part 25 and the wiring 44 may make contact with a vehicle body side part 45 at the time of aligning the plate member 30. If the eaves member 42 is provided, however, such a contact can be prevented from occurring.

As aforementioned, in accordance with the wire connection structure for vehicle optional parts according to the present invention, the main-side output cord H branched from the main harness M is preliminarily connected to the back surface side of the power socket S through the couplers C. In addition, the option-side output cord A and the input cord B of common structures are provided at one-end portions of the optional part harnesses. Further, at the time of additionally installing each optional part, the option-side output cord A is connected to the power socket S, the main-side output cord H or the option-side output cord A detached from the power socket S is bent into a U shape and connected to the input cord B. Therefore, it is possible to allow the optional part harness to cut in the line between the power socket S and the main-side output cord H and thereby to secure a power supply for the optional part, while retaining the function of the power socket S. In this case, the main-side output cord H or the option-side output cord A bent into the U shape and the input cord B can be easily bundled collectively. Accordingly, an operation of additionally installing an optional part harness is facilitated, and a wiring space can be reduced.

Note that the structure of the off-road four-wheel-drive vehicle, the form of the optional part, the length of the optional part harness, the standards of the couplers and the like are not limited to those in the aforementioned embodiment but may be modified variously. The application of the wire connection structure for vehicle optional parts according to the present invention is not limited to the aforementioned off-road four-wheel-drive vehicles, and the wire connection structure is applicable to various vehicles including saddle type motorcycles and motor tricycles.

DESCRIPTION OF REFERENCE SYMBOLS

1 . . . Off-road four-wheel-drive vehicle (vehicle), 9 . . . Instrument panel, 30 . . . Plate member, 25 . . . On-off switch, 38 . . . Motor, 40 . . . Large-diameter wiring, 52 . . . Gathering part, 55 . . . Auxiliary light (first optional part), 56 . . . Winch device (second optional part), C . . . Coupler, C1 . . . Male coupler, C2 . . . Female coupler, S . . . Power socket, M . . . Main harness, H . . . Main-side output cord, OP1 . . . First optional part, OP2 . . . Second optional part, OPH1 and OPH2 . . . Optional part harness, A . . . Option-side output cord, B . . . Input cord, G . . . Gathered wiring, F1 . . . Support frame

What is claimed is:

1. A wire connection structure for a vehicle optional part, the wire connection structure comprising a power socket connected to a power supply of a vehicle, the wire connection structure obtaining a power supply for an optional part by cutting in a feeder path supplying electric power to the power socket, wherein a main-side output cord for supplying electric power to the power socket is branched from a main harness in which a plurality of wires are bundled;

the power socket and the main-side output cord are disconnectably connected to each other through a pair of couplers;

an optional part harness for supplying electric power to the optional part attached to one end side thereof is provided at another end portion thereof with an option-side output cord and an input cord which are bifurcated from a gathering part;

the option-side output cord and the power socket are disconnectably connected to each other through a pair of couplers, and the input cord and the main-side output cord are disconnectably connected to each other through a pair of couplers;

the option-side output cord is formed to be longer than the input cord; and at the time of additionally installing the optional part in the vehicle, the option-side output cord of the optional part harness for the optional part to be additionally installed is connected to the power socket, and the main-side output cord or the option-side output cord which has been connected to the power socket is bent into a U shape and then connected to the input cord.

2. The wire connection structure for a vehicle optional part according to claim 1, wherein the option-side output cord and the input cord each individually have a same structure for different optional parts.

3. The wire connection structure for a vehicle optional part according to claim 1, wherein the main harness is laid in an up-down direction of the vehicle;

the option-side output cord is provided at an end portion thereof with a male coupler of the pair of couplers; and the power socket and an end portion of the input cord are each provided with a female coupler of the pair of couplers.

4. The wire connection structure for a vehicle optional part according to claim 2, wherein the main harness is laid in an up-down direction of the vehicle;

the option-side output cord is provided with a male coupler of the pair of couplers; and the power socket and the input cord are each provided with a female coupler of the pair of couplers.

5. The wire connection structure for a vehicle optional part according to claim 4, wherein the optional part harness is laid along a support frame extending in a vehicle width direction of the vehicle over the power socket.

6. The wire connection structure for a vehicle optional part according to claim 5, wherein a large-diameter wiring for supplying electric power to a motor for a power steering mechanism is laid along the support frame.

* * * * *